Feb. 2, 1965 J. MIROUX 3,168,053
CONTROL OF CONVEYORS
Filed Nov. 28, 1960 9 Sheets-Sheet 1

INVENTOR:
JEAN MIROUX
BY Irvin S. Thompson
ATTORNEY

INVENTOR:
JEAN MIROUX
BY Irvin S. Thompson
ATTORNEY

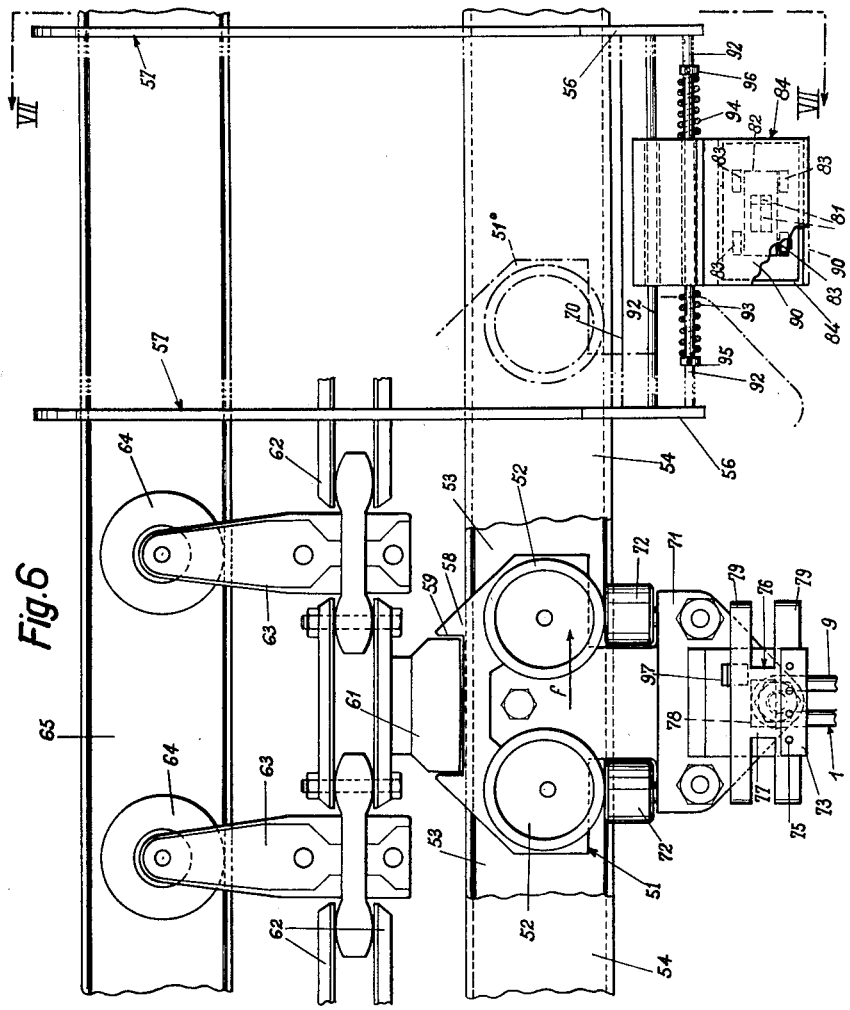

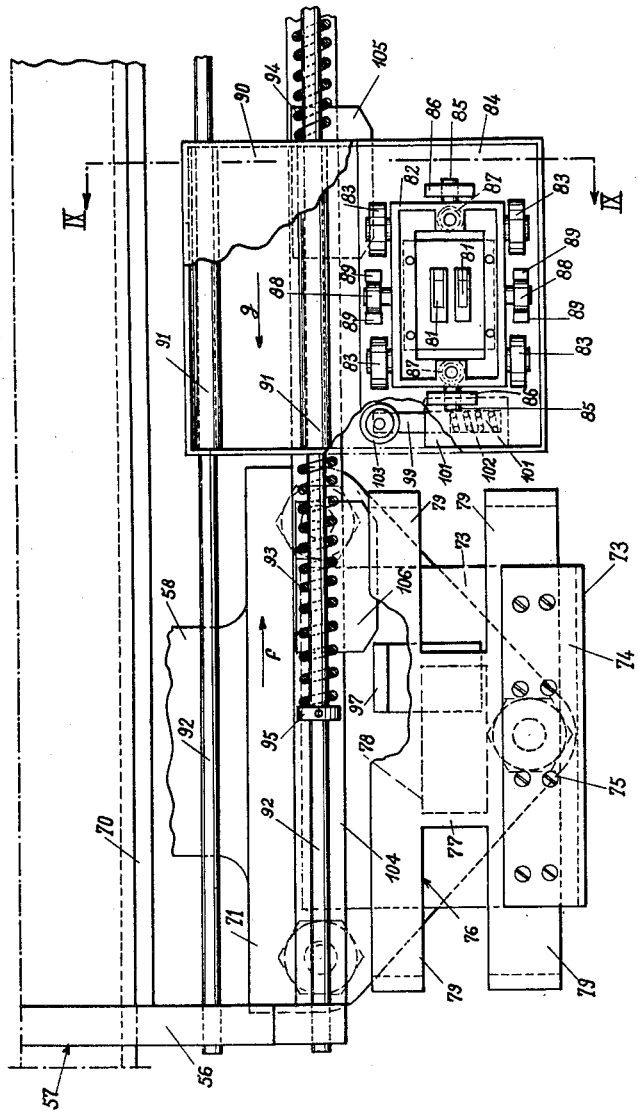

Feb. 2, 1965   J. MIROUX   3,168,053
CONTROL OF CONVEYORS
Filed Nov. 28, 1960   9 Sheets-Sheet 6

INVENTOR:
JEAN MIROUX
BY Irvin S. Thompson
ATTORNEY

Feb. 2, 1965   J. MIROUX   3,168,053
CONTROL OF CONVEYORS
Filed Nov. 28, 1960   9 Sheets-Sheet 8

INVENTOR:
JEAN MIROUX
BY Irvin S. Thompson
ATTORNEY

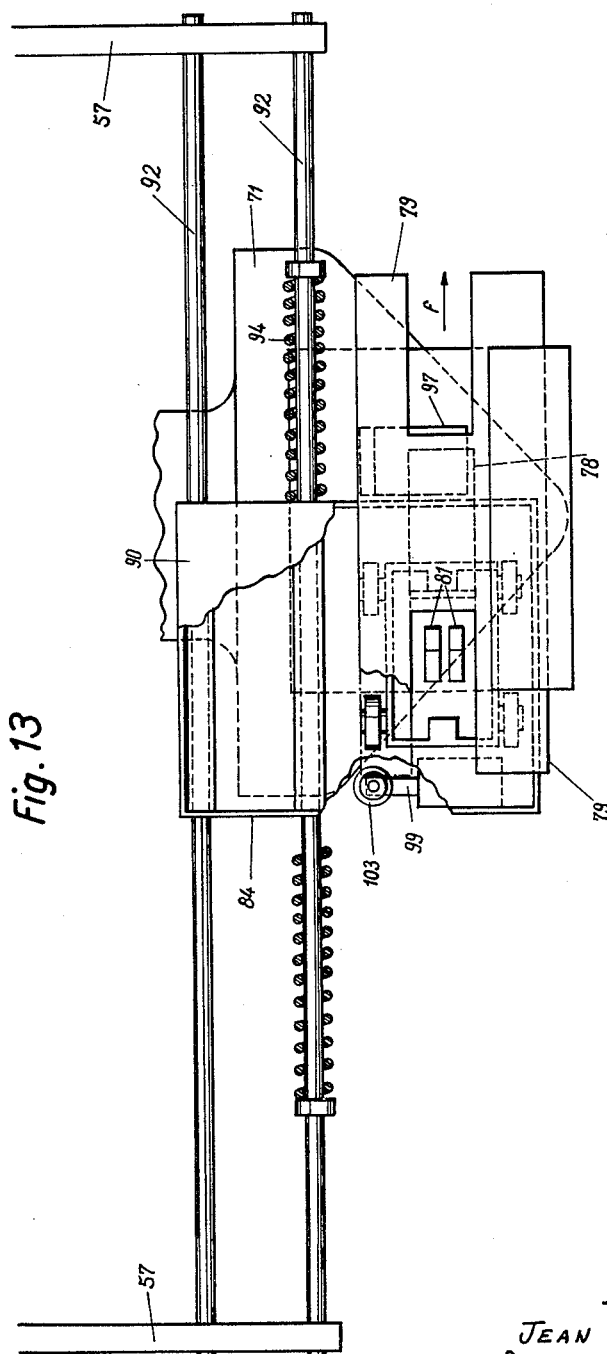

United States Patent Office 3,168,053
Patented Feb. 2, 1965

1

3,168,053
CONTROL OF CONVEYORS
Jean Miroux, Paris, France, assignor to Association des Ouvriers en Instruments de Precision, Paris, France, a corporation
Filed Nov. 28, 1960, Ser. No. 72,224
Claims priority, application France, Dec. 15, 1959, 813,038
9 Claims. (Cl. 104—88)

The present invention relates to improvements in and relating to the control of conveyors including movable members adapted to be moved either according to different sequences or along different paths, with possible conjunction of these two alternative motions.

The improvements provided by the invention may be applied to any type of conveyors, namely those of the overhead type including skips suspended from a rail along which they are driven or else those consisting of carriages which rest on a roller path or track and are guided by rails or ramps.

Means have already been provided for effecting the individual remote-control of the movable elements of a conveyor through electro-mechanical selector means, whereby a specific element of said conveyor may be, for example, identified and thereafter shifted or switched, as a consequence of this identification, in accordance with a pre-set program.

This program may consists of a special displacement of the skip: lifting the same up or down, switching the same to another track through a convenient point, or it may consist in loading or unloading the skip. It may also include an operation exterior to the skip and the conveyor, for example, starting a machine, projecting a paint on the object carried by the skip and so forth.

All these various operations, well known in the art, are performed by means of electric relays, which may be named actuator relays. These relays are controlled by convenient pulses delivered by selecting devices adapted to identify in a definite location a predetermined movable element of the conveyor when it is carried along. The invention pertains more precisely to said selecting devices and consists of new means for performing said selection of the movable elements of the conveyor, the identification signals thus produced being thereafter used in a conventional manner for the subsequent remote control of the predetermined movable elements of the conveyor.

The heretofore known selecting devices include either retractable studs allowing for the achievement of various combinations which are read out by scanning combs, or conducting blades which are connected to a multi-channel switch and scanned by a brush arrangement. One group of members is fitted on the skip while the other one is stationary. Such arrangements are however attended by several drawbacks in that they are of rather delicate construction and liable to frequent uncorrect operation resulting from an impairment in the adjustment. Moreover, any required increase in the number of possible combinations leads to complicated and therefore costly arrangements.

The purpose of the present invention is to obviate the aforesaid drawbacks by the provision of electromagnetic means whereby information relating to one or several movable elements of a conveyor may be stored, transmitted and read out.

2

According to the invention, the system for the individual remote-control of the movable elements of a conveyor is essentially characterized in that it comprises storing devices or memories adapted to have recorded thereon in magnetic form and according to a suitable code the information relating to said remote-control. Said system comprises on the other hand pick-up devices or readers adapted to scan said memories in order to control said actuator relays. Moreover, said system is such that some of said devices, preferably the memories, are mounted on the movable elements of the conveyor while the complementary devices such as the readers are mounted in a substantially stationary manner, the scanning of the memories by the readers being thus effected during the displacement of the movable elements of the conveyor as a result of the thus produced relative movement.

In a preferred embodiment of the invention, a code of the redundant type is used for recording in the memories information relating to the remote-control of the movable elements of the conveyor. An arythmic reading from these memories may thus be effected.

According to an advantageous embodiment of the invention, the relative movement between the memories and readers results from the action of resilient members which are triggered by the drive of the conveyor itself.

The scanning of the memories may thus, to a certain extent, be rendered independent from the characteristics of the conveyor drive.

Other particular features of the invention, relating to various embodiments of the aforesaid provisions, will still result from the following description.

In the accompanying drawings, given by way of non-restrictive examples,

FIG. 6 is a lateral elevational view of a preferred embodiment of overhead conveyor designed according to the invention the position of the conveyor trolley just before reading the memory being partially shown in hatched lines.

FIG. 8 is a detailed view on an enlarged scale of a portion of FIG. 6 wherein the trolley of the conveyor has reached the position in hatched lines of FIG. 6, some parts of the device being cut away.

FIGS. 11 to 13 are views similar to FIG. 8, with parts torn off showing with greater detail the three subsequent steps of a reading operation of the memory of a trolley at a reading station, these steps corresponding to those diagrammatically shown on FIG. 10.

Figure 1:
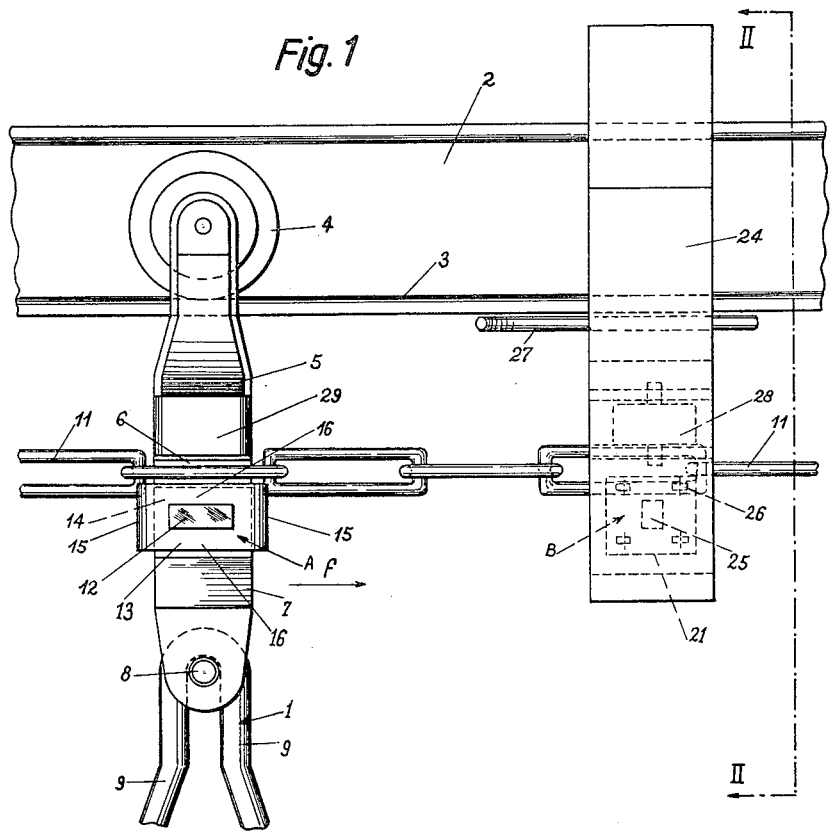
FIG. 1 is a diagrammatic view of a simplified embodiment according to the invention, in the case of an overhead conveyor.

The simplified embodiment of the invention which will be described with reference to FIGS. 1 and 2 relates to a device for effecting the remote-control of the skips 1 of an overhead conveyor, of a type known per se.

This conveyor comprises a rail 2 consisting of an I-shaped beam having its bottom flange 3 arranged to serve as a roller-path for rollers 4 of a trolley comprising a fork 5.

The uprights 6 of the fork 5 have secured thereto a binding iron 7 supporting through a spindle 8 the rods 9 from which the plate (not shown) of the skip 1 is suspended, said plate serving to convey any kind of loads.

The skip 1 is driven, for example in the direction $f$, through a link chain 11 whereof one link encloses the uprights 6 of fork 5, said chain being driven along $f$ by any suitable means.

According to the invention, magnetic memories A are provided along at least one portion of the trolley of skips 1. In the example shown, each memory consists of a magnetizable coating 12 deposited over a non-magnetic metal plate 13 secured to a projection 14 on one of the uprights 6.

The magnetizable area 12 is adapted for keeping recorded thereon any information which may be of use either for the identification of skip 1 or for the desired switching thereof and, more generally, for any signalling or remote-control operations relating either to said skip or to the conveyor, or else to any operation made in connection with the conveyor. Said information is laid onto the areas 12 by any known recording apparatus and according to any transcription code.

Plate 13, which has its end portions 15 bent round, is of greater width than the rectangle 12 so as to provide roller paths 16, this arrangement allowing for an easier guiding of the reader B, as will be set forth.

In the example shown, said reader comprises a carriage 21 secured through a resilient suspension structure 22 to a support 23 rigid with a bracket 24 attached to the rail 2 at the location selected for the reading device (hereinafter termed a reading station). Due to the resilient mounting means 22, the carriage 21 is liable to receive lateral swinging movement, i.e. oscillating movement about its longitudinal axis (substantially parallel to the trolley track) and to receive a transversal displacement, i.e. a displacement towards the bracket 24 or away therefrom. On the simplified structure shown, this is obtained only by fixing the carriage 21 to helical springs shown on FIG. 2 which constitute the resilient suspension 22. More elaborate mounting means which impart the same degrees of freedom to the carriage will be disclosed below in a more detailed manner about the description of a second embodiment of the invention.

The carriage 21 carries at least one reading head 25 accurately positioned at the height of the path of the magnetizable areas 12 borne by the plates 13 of the trolleys and facing the latter. Provided on either side of the head 25 is a rolling train consisting of two pairs of rollers 26 respectively registering with the roller paths 16 on plate 13. Each reading head 25 is connected to an electronic unit (not shown) comprising amplifier and detector means, this unit being adapted to control in turn, through suitable relays, any devices either included in or distinct from the conveyor.

The bracket 24 also carries a guiding arrangement for the skip 1, adapted to prevent the latter from swinging laterally when reaching the reading device. This arrangement comprises converging guides 27 secured to bracket 24 and the wall together with a pair of rollers 28 arranged in the vertical plane containing reader B and adapted to be engaged by registering roller-paths 29 on the uprights 6 of the skip.

The operation of this arrangement will be readily understood: when the trolley of a skip 1 approaches a bracket 24, the guides 27, by frictionally engaging the arms of fork 5, bring said skip into a vertical plane, if shifted therefrom by transverse oscillation, this guiding action being thereafter improved by the rollers 28 encompassing the roller paths 29.

At the same time, the rollers 26 of frame 21 are repelled by the plate 13, thereby compressing the springs 22, and rollers 26 run along the tracks 16 on said plate. Since the magnetizable area 12 is moving past the reading head 25, it is thoroughly scanned thereby as the skip progresses.

As the gap between the operating part of the reading head 25 and the tangent plane, parallel to the bottom of carriage 21 and common to all rollers 26, is fixed, the compression of springs 22 is effective to hold the reading device pressed against plate 13 with a constant air-gap, irrespective of the vibration or slight remanent wagging thereof.

The reading from memories A may thus be effected with a very low number of mechanical moving parts.

The information picked up by the reading head 25 and suitably decoded and sensed by any analyser system allow suitable servo-control means to effect correct switching of the identified skip all along the path to be followed thereby in the intricate network of the conveyor or to select said skip at command when stored on a standby loop.

It is evident that the system according to the invention is liable to numerous adaptations according to the requirements. Thus, some of the readers B may be mounted on skips 1, and conversely memory plates for storing information may be provided at fixed locations along the conveyor travel.

While any type of code may be used for impression on the memories A, use is made according to an advantageous embodiment of the invention of a code of the redundant type, this allowing for an arythmic reading, which therefore is absolutely independent from the law of motion of the skips while affording other advantages to be set forth hereafter.

The term "redundant code" is used to designate a code wherein the recording of a given datum involves, on an average, the use of a number of magnetic elementary loads or bits higher than the very minimum required.

The extra quantity of information thus recorded on the magnetizable area 12 allows for useful checkings.

Figure 3:
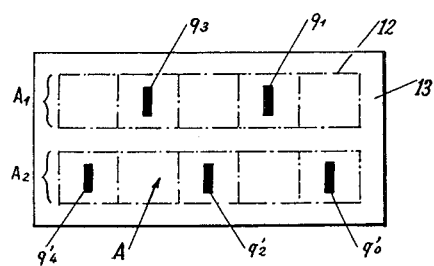
FIG. 3 is a diagrammatic plane view of a magnetic memory for the aforesaid conveyor.

FIG. 3 is a block diagram illustrating the application of such a code to the area 12 on plate 13. Area 12 is divided for this purpose into a pair of tracks $A_1$, $A_2$. The first track $A_1$, receives the numeral information expressed in binary terms, the presence of a bit $q$ corresponding to the digit 1 while the absence thereof corresponds to the digit 0.

The second track $A_2$ receives the complement to 1 of the digit on track $A_1$.

The memory A in the specific example of FIG. 3 having a maximum capacity of five bits has a digital capacity of $2^5=32$. On track $A_1$, the recorded cipher represented by the bits $q_1$ and $q_3$ corresponds to the decimal number $2^1+2^3=10$. According to the adopted redundant code, track $A_2$ bears no bit adjacent to bits $q_1$, $q_3$, but, in contrast, contains bits recorded at $q'_0 q'_2 q'_4$. It is clear that track $A_1$ receives the identification number of the corresponding skip 1 and expressed in binary form, whereas track $A_2$ is of ancillary nature formed by recording binary bits in places corresponding to those of track $A_1$ wherein a bit is absent.

Information from memory A is picked up by two associated heads on reader B, which scan tracks $A_1$, $A_2$ respectively. Under these conditions, the pickup arrangement is independent from the scanning velocity, because time does not play any part in the reading. In fact, completion of the reading out of any given memory is obtained when a total of 5 binary bits have been counted while reading both tracks $A_1$ and $A_2$ together. For this reason, the system under consideration is really arythmic.

The invention thus allows effectively for an arythmic reading. Moreover, if two bits happen to be adjacent on tracks $A_1$ and $A_2$ or, on the contrary, simultaneously absent therefrom, then it may be deduced that the initial recording is uncorrect. This detection prior to the eventual signalling may be automatically effected by the electronic stages in readers B.

Figure 4:
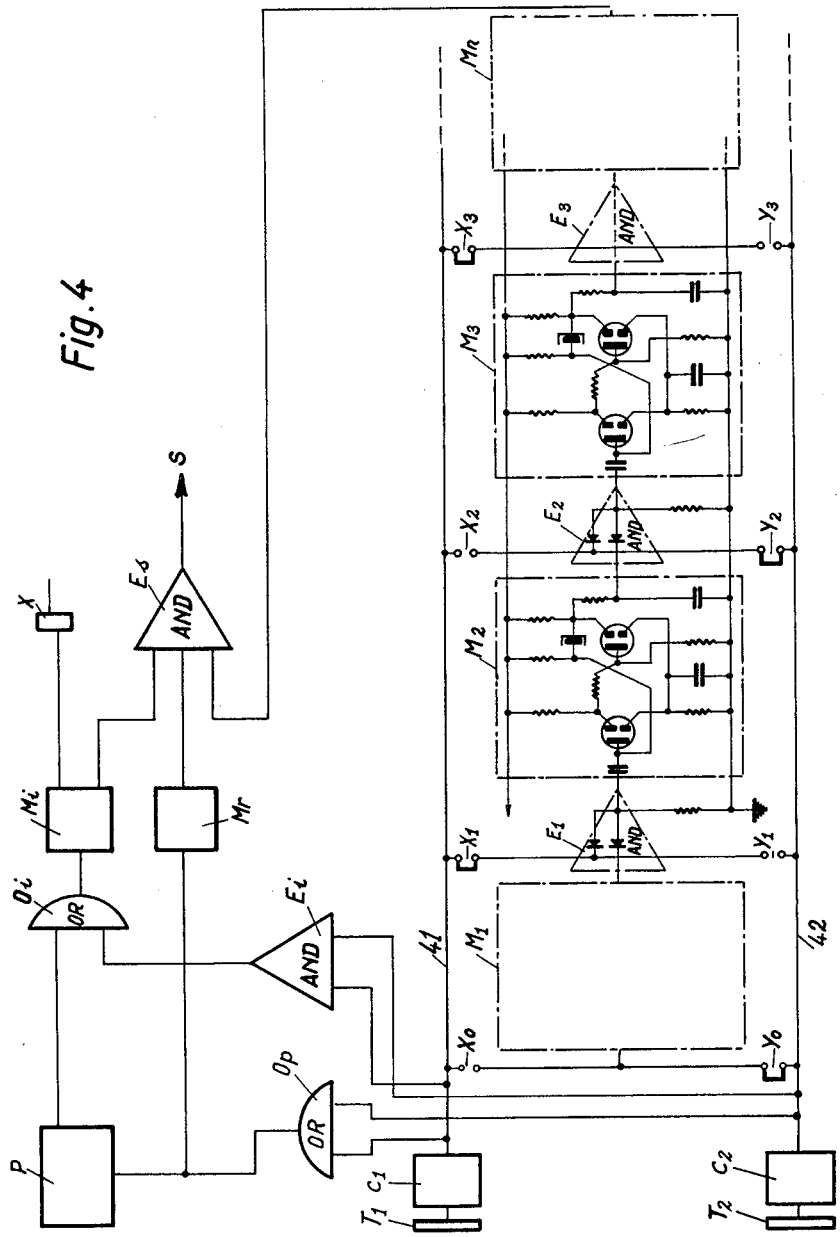
FIG. 4 is a diagram showing the electronic stages of a reader for the aforesaid memories.
Figure 7:
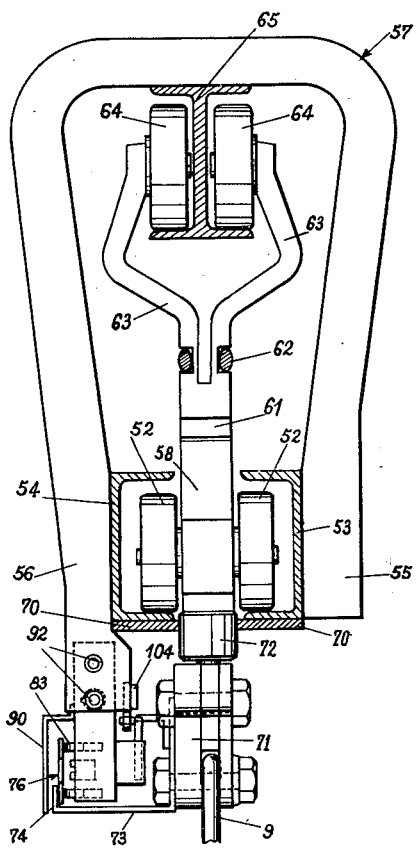
FIG. 7 is the corresponding front sectional view, taken along VII—VII of FIG. 6.
Figure 9:
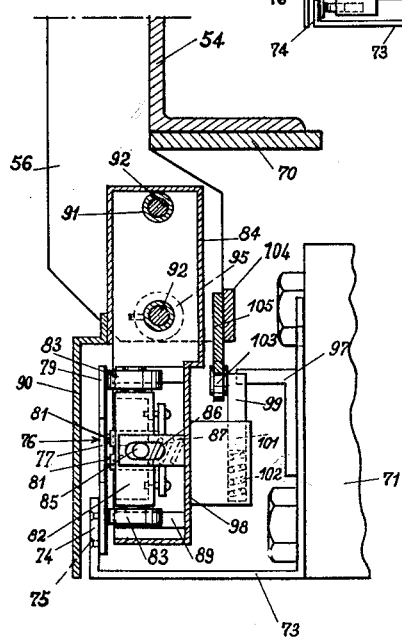
FIG. 9 is a similar view of a portion of FIG. 7.

FIG. 4 illustrates a circuit arrangement which constitutes a comparator for comparing the number read out from the memory A by reader B and a number previously registered at the reading station in order to detect the coincidence between both numbers. Said comparator is also arranged to cause a detection of the eventual errors which occurred during the recording of the memories A. In this arrangement, the reading heads for tracks $A_1$, $A_2$ are diagrammatically shown at $T_1$ and $T_2$ respectively, said heads being connected to the amplifiers $C_1$, $C_2$ which are also effective to calibrate the impulses.

The output of these amplifiers is parallel-fed to two circuits. The first circuit consists of conductors 41, 42 leading to a counting chain adapated to ascertain whether the combination recorded on each memory is consistent or not with the desired combination. For this purpose, the conductors 41, 42 have connected thereacross a series of monostable multivibrators $M_1$, $M_2$ ... $M_n$ separated from each other by conventional "AND" circuits $E_1$, $E_2$ ... $E_{(n-1)}$ where $n$ is an integer such that $2^n$ represents the number of possible distinct combinations. The stages $M_1$ and the stages E are connected either to conductor 41 or to conductor 42 according to the identification number to be registered by the comparator. The possible connections for the stages $M_1$, $E_1$, $E_2$, $E_3$, etc. ... are respectively schematized in $X_0$, $Y_0$; $X_1$, $Y_1$; $X_2$, $Y_2$; $X_3$, $Y_3$; etc.

According to the recording example given in FIG. 3, the identification circuit provided for the number 32 recorded is to be such that the first bit $q'_0$, read out by the reading head $T_2$ and transmitted to conductor 42 shall reach the multivibrator $M_1$, so that the connection $Y_0$ is on.

The second bit $q_1$ sent to the conductor 41 shall be transmitted to $M_2$ so that the connection $X_1$ is on, etc.

As will be explained below, if the number recorded on the memory A does not correspond to the combination of connections $X_0$ or $Y_0$; $X_1$ or $Y_1$; etc. ... preset in the counting chain, the sequence of bits read out cannot be transmitted to the last multivibrator $M_n$.

The second circuit, ensuring the checking of the eventual errors in recording and the subsequent control, comprises in connections across the conductors 41, 42 an "OR" circuit $O_p$ associated with a counter P and an "AND" circuit $E_i$ leading to an "OR" $O_i$ also controlled by counter P. This counter, of conventional structure, is so arranged that it delivers a bit to the "OR" stage $O_i$ if it receives more than $n$ bits, and no bit if the number of the bits totalized by it is lower or equal to $n$.

The output of circuit $O_i$ is fed to a conventional monostable inhibition multivibrator $M_i$ controlling both a device X for signalling any miscoding and an "AND" circuit $E_s$, also controlled by a standby monostable multivibrator $M_r$ connected to $O_p$ and by the monostable multivibrator $M_n$ in the counting chain.

Circuit $E_n$ in turn controls a relay S adapted to achieve the actuation required for the relevant reading set. When the multivibrator $M_i$ is not triggered by the stage $O_i$, it is so connected that the relay X is not energized and that a signal of free passage is applied to the stage "AND" $E_s$. If the combination to be identified by the reading set under consideration corresponds to the decimal number 10 which is assumed to be recorded in binary code on the memory A of FIG. 3, then the connections in the reader B concerning the stages $M_1$, $E_1$, $M_2$, $E_2$, etc. are those shown in FIG. 4.

Since each monostable multivibrator $M_1$, $M_2$ ... $M_n$ is adapted to deliver an output signal to the next "AND" circuit only after a delay higher than the duration of the calibrated impulse on conductors 41, 42, it will be seen that the first impulse $q'_0$ transmitted by the conductor 42 shifts the multivibrator $M_1$. When the next impulse $q_1$ appears on conductor 41, circuit $E_1$ shifts the next multivibrator $M_2$, and so on until shifting of multivibrator $M_5$ caused by the last bit $q'_4$ whereby a signal of free passage will be fed to circuit $E_s$. As $E_s$ receives already a signal of free passage from the multivibrator $M_i$, and from the multivibrator $M_r$ which is triggered by the pulses transmitted on either conductors 41, 42, the signal delivered by the multivibrator $M_5$ causes the stage $E_s$ to become passing, and the relay S is energized.

If the number read out in memory A does not correspond to the identification number registered in the comparator, the chain $M_1$, $E_1$, $M_2$, $E_2$, etc. ... cannot be energized up to the end so that the terminal multivibrator $M_n$ ($M_5$ in the example) is not triggered, and the stage $E_s$, receiving only two signals of free passage, remains blocked so that the relay S is not energized.

In operation, counter P sums up the pulses along both conductors 41, 42, transmitted thereto through the "OR" stage $O_p$. If the total of said pulses reaches $(n+1)$ (or 6 according to the example chosen), the counter P triggers the multivibrator $M_i$.

Similarly, if two pulses are simultaneously transmitted on conductors 41, 42, the stage "AND" $E_i$ triggers the multivibrator $M_i$ through the stage "OR" $O_i$.

In both cases, $M_i$ energizes the signalling relay X, whereas the "AND" stage $E_s$ is blocked and the actuation relay S cannot be energized.

Counter P sums up the impulses transmitted on both conductors 41, 42 and triggers the multivibrator $M_i$ if this total is uncorrect. Similarly, circuit $E_i$ triggers the multivibrator $M_i$ if two impulses are transmitted simultaneously on conductors 41, 42. In both cases, multivibrator $M_i$ energizes the signalling circuit X.

On the other hand, if none of the aforesaid errors has been detected, multivibrator $M_i$ delivers a positive voltage to circuit $E_s$ which, in the case considered, has already received a positive voltage from the multivibrator $M_n$.

The standby multivibrator $M_r$ supplies a positive voltage after a delay following the arrival of the last impulse in the reading train, this delay affording an opportunity for a possible spurious impulse to become effective to block the output circuit by shifting the multivibrator $M_i$.

After each decoding operation, the reading device is automatically reset.

It will thus be appreciated that by the use of simple electronic means the system according to the invention is adapted to ensure both a rapid and accurate operation. It is clear that the code used for recording the magnetic memory A while using bits distributed along two tracks $A_1$, $A_2$ and in correlation with each other with respect to the number and location thereof on each track allows an arythmic scanning of said magnetic memory. By "arythmic" is conventionally meant that the device does not necessitate any time base (such as timing wheels, energizing timing generators or the like) exterior to the signal to be scanned. This is an important factor for the safe and reliable operation of the device.

It is clear that the decoding circuit in FIG. 4 may be modified according to the requirements. Thus, when decoding should only be effected from impulses of a predetermined order, then the multivibrator $M_1$, or circuits $E_1$, $E_2$ etc. ... of a non-involved order may be fed through "OR" circuits instead of being directly fed by the conductors 41, 42.

Figure 5:
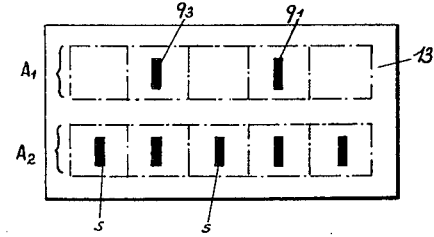
FIG. 5 is a view similar to FIG. 3, relating to a different code.

Of course, other codes might be employed. One of them is diagrammatically shown in FIG. 5, where track $A_2$ is regularly impressed with bits $s$ serving as locating marks. This embodiment is another example of the use of a redundant code for obtaining an arythmic reading out of the memory. But in that case no quantitative correlation is established between the tracks $A_1$, $A_2$ apart from the geometric correspondence in the positions of the bits, so that an eventual error in the recording cannot be detected.

The preferred embodiment of the invention which is to be described with reference to FIGS. 6 to 9 relates to a conveyor of a specific type, known per se, wherein the skips 1 are suspended from trolleys 51 subjected to the action of a driving device through a connection of removable character.

The roller path provided for the rollers 52 of the trolleys 51 comprises two rails 53, 54 secured to the arms 55, 56 of a fixed frame or bracket 57.

The frame structure 58 of the trolley 51 is movable between the rails 53, 54. This structure is provided at its upper portion with a recess 59 wherein a projection 61 may be removably fitted, said projection forming the push-member of a second trolley driving the conveyor. As a matter of fact, said second trolley is connected to a chain 62, suspended from forks 63 which carry rollers 64 bearing against a rail 65 secured to the brackets 57. It will be understood that when the rails 65 and 53, 54 are at the relative spacing provided in FIGS. 6 and 7, the projection 61 engages the recess 59, then trolley 51 will be driven. Reversely, when the spacing between the rails 53, 65 increases, projection 61 will be cleared from recess 59 and the motion of trolley 51 will become independent from that of chain 62.

On the other hand, the frame structure 58 of trolley 51 has a downward extension in the form of a triangular end plate 71 serving as a fastener for the suspension rods 9 of the skip. Mounted on said end plate 71 are rollers 72 adapted to bear against the edges of rails 53, 54 and thus damp the skip oscillation. Such arrangements are known per se.

The improvements provided by the invention in the above device relate particularly to a specific arrangement of the memories and reading device whereby the scanning of the magnetizable area of these memories may be effected under optimum safety and accuracy conditions. This arrangement will be described presently.

Firstly, the rails 53, 54 are provided with two transversely aligned shoes 70 adapted to reduce the rail spacing to the precise clearance permitting the passage of the rollers 72.

Besides, the end plate 71 has secured thereto a trough 73 to the outer edge 74, of which is attached by means of screws 75 a H-shaped plate 76 (FIG. 8) of nonmagnetic metal. The central portion 77 of plate 76 is provided on its side facing the end plate 71 with a magnetizable area 78 made of a coating capable of storing magnetic loads. The two marginal projections 79 of plate 76 respectively located above and beneath area 78, extend a substantial distance beyond the central portion 77 and are bevelled at their opposite ends. Said marginal portions act, as will be described, as rolling paths prior to, during and subsequent to the reading process and the length of the projections 79 is designed in accordance.

Figure 2:
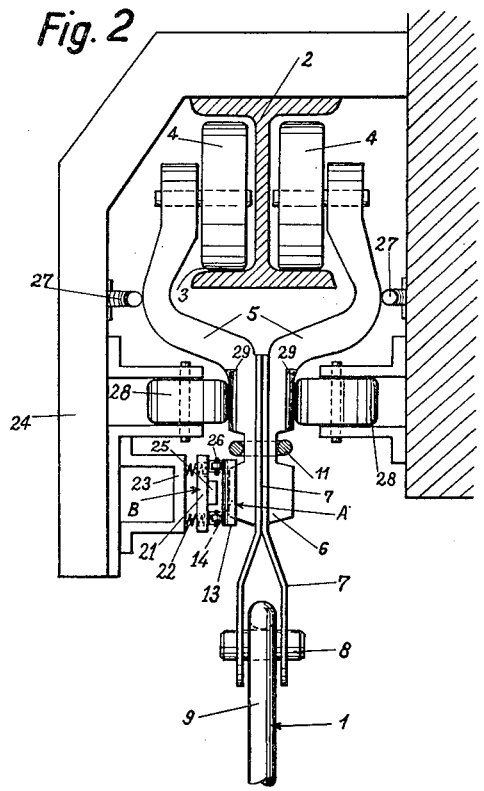
FIG. 2 is a front sectional view of this conveyor, taken along II—II of FIG. 1.

The reading device is designed, as in the case of the embodiment in FIGS. 1 and 2, to provide a constant gap between the reading heads 81 and track 78.

To this effect, the heads 81 are supported by a carriage 82 provided with loose rollers 83, the spacing of which corresponds to that of the marginal portions 79 of plate 76.

The carriage 82 is pivotally mounted and resiliently suspended with respect to its mounting casing 84. For this purpose, it is fitted with two axial pivot pins 85 inserted into ovalized bearings 86. Carriage 82 is moreover acted upon by compression springs 87 bearing against the casing 84. Additional guiding of the carriage 82 is ensured by other lateral rollers 88, held in position by abutments 89. The carriage assembly 82 is protected by an apron 90 sufficiently spaced from rollers 83 to permit the free passage of plate 76.

Moreover, the mounting of the reading set at the reading station is such that the reading operation be effected during a drive of the carriage 82 with its supporting casing 84 in the direction g opposite to the direction f along which the skip 1 is driven.

To this end, the casing 84 is slidably mounted by means of sleeves 91 for movement along two parallel rods 92 stretching between two adjacent brackets 57.

One of the rods 92 has threaded thereon two coil springs 93, 94 located on either side of the casing 84, respectively. Said springs are arrested by adjustable abutments 95, 96.

The momentary drive of the casing 84 in the direction f is effected by a retractable device comprising, on the end-plate 71, a bracket 97 and at the same height on the face 98 of the casing 84 remote from the carriage 82, a slidable pin 99, partly inserted in a housing 101 and held in its upper position by a spring 102. Mounted laterally of the pin 99 is a roller 103 extending substantially in the same vertical palne as a flat iron 104 which is mounted between the arms 56, in parallel relationship to rod 92. To the iron 104 are secured a pair of cams 105, 106 which are engageable by the roller 103 when the casing 84 is sliding along the rods 92 respectively into the directions f and g.

Figure 10:
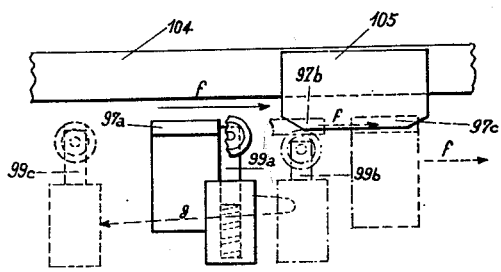
FIG. 10 is an explanatory diagram showing the operational sequence.
Figure 11:
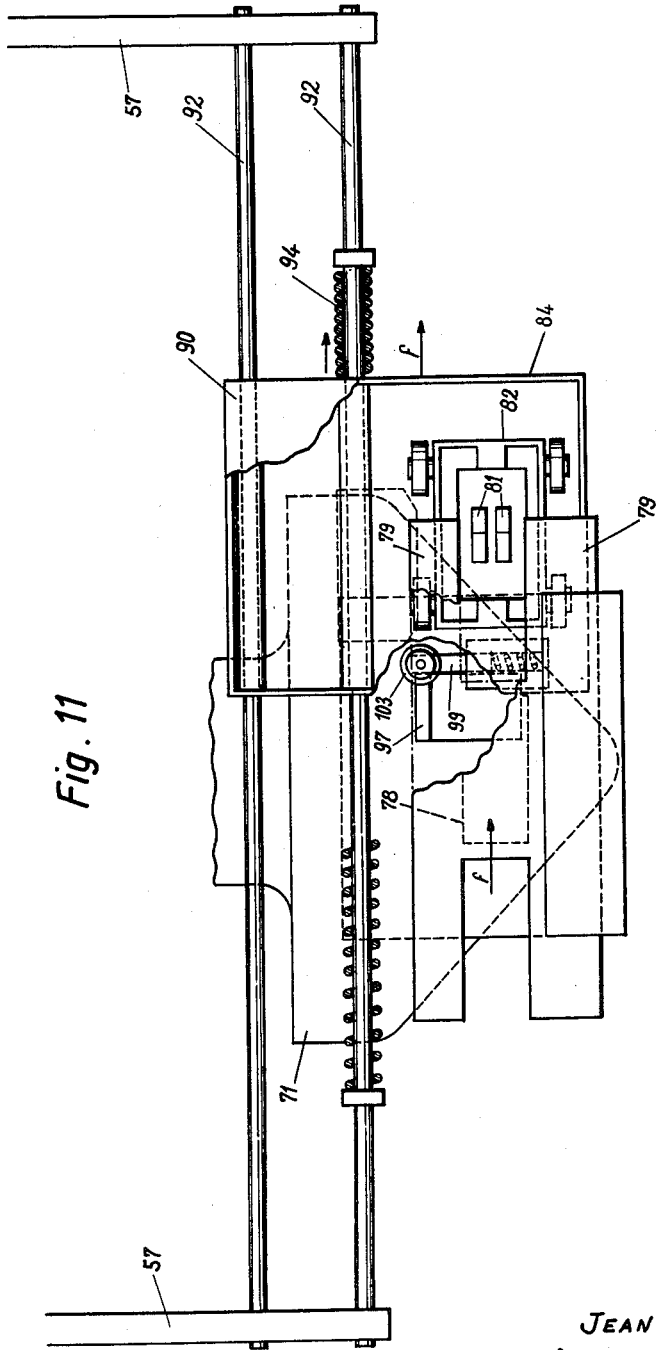
Figure 12:
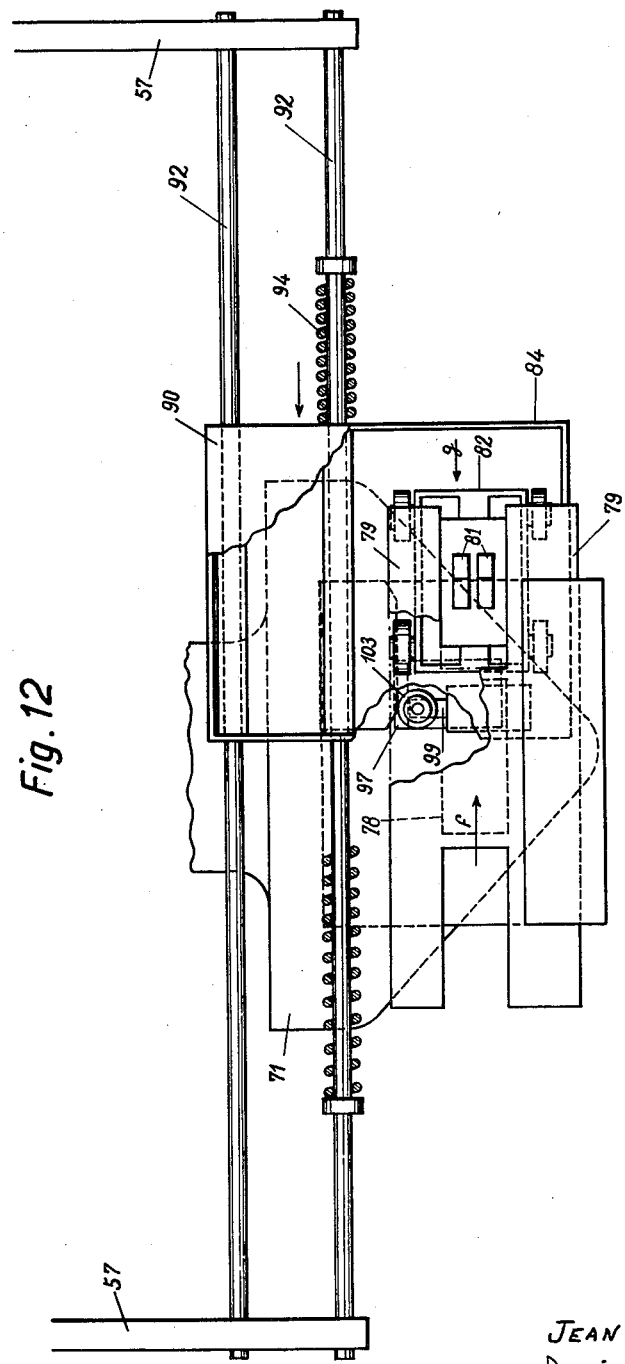

The arrangement operates as follows: the casing 84 is initially in the position of FIG. 6 named rest position. The trolley 51 which is held in the transverse direction by the shoes 70 engaged by rollers 72, causes by its movement in the direction f the marginal portions 79 of the plate 76 to push the rollers 83 of carriage 82 into the interior of the casing 84, said displacement being allowed by a sliding movement of the pivot pins 85 in the bearings 86 and by compression of the springs 87. The marginal projections 79 are of such length that the four rollers 83 are bearing thereon (i.e. on the plate 76) before the reading heads 81 have reached the area 78. At this stage, bracket 97 has come to abut against the rectractable pin 99, thereby rigidly connecting casing 84 and trolley 51 for movement into the direction f, with the result that there is no more relative displacement between the area 78 and the reading heads 81 (stage a in FIG. 10). This driving thrust applied by the trolley to the casing 84 causes the same to slide along the rods 92 by compressing the spring 94, when the roller 103 is engaged by cam 105, it is lowered by subsequent retraction of pin 99. The passage is then made free for the bracket 97 which will still be driven along with the trolley (stage b in FIG. 10). The casing 84, being then only acted upon by the loaded spring 94, is repelled into the direction g and moves back to its initial position. During this movement, the reading heads 81 are moving along area 78, which is thus scanned through. A few instants later, the parts are located in the position shown at c in FIG. 10.

During the reading process, the extents of freedom provided for carriage 82 with respect to casing 84 ensure an accurate bearing contact of all the rollers 83 on the marginal projections 79 and on the rest of the rolling paths, irrespective of the remanent oscillation of the skip. As a result, the gap between track 78 and the reading heads 81 may be maintained at a strictly constant value.

The additional velocity imparted to the reading heads by the release of spring 94 allows for clear detection of the signals recorded on track 78, this being true irrespective of the natural velocity of the skip and even when such velocity is substantially zero.

This particular feature is important for, should the conveyor stop short, then the provided arrangement will however ensure a complete reading. As a matter of fact, if the stop occurs before retraction of pin 99, then the reading has still not commenced and in the opposite case, the reading will be integrally effected.

Moreover, it will be appreciated that an accidental backward displacement of the skips cannot have any detrimental effect.

Obviously, the invention is not limited to the above embodiments, but within the scope of the appended claims, could also be applied to conveyors other than of the overhead type.

What I claim is:
1. In a conveyor comprising a plurality of movable trolleys driven along a track, a system using magnetically recorded coded information for the individual remote control of said trolleys, said system comprising on some at least of said trolleys a plate rigidly fitted thereon, a magnetizable area on said plate for magnetically storing information useful to said remote control, two paths on said plate respectively adjacent to said area and substantially parallel to said track, at least one reading station fitted along said track, said station comprising a frame, a carriage borne by said frame, mounting means on said frame for said carriage and adapted for lateral swinging movement and transversal displacement of said carriage relative to said frame, two pairs of rolling members rotatably fixed on said carriage, electromagnetic reading means for scanning said magnetizable area of said trolley plate, said reading means comprising at least one electromagnetic reading head secured to said carriage, and resilient means secured to said frame and acting on said carriage for registering each pair of said carriage rolling members respectively with one of said plate paths when said trolley passes by said station, thereby temporarily providing a constant air gap between said reading head and said magnetizable area of said plate.

2. In a conveyor comprising a plurality of movable trolleys driven along a track, a system using magnetically recorded coded information for the individual remote control of said trolleys, said system comprising on some at least of said trolleys a plate rigidly fitted thereon, an area on said plate covered with a magnetizable coating for magnetically storing information useful to said remote control, two paths on said plate, respectively adjacent to said area and substantially parallel to said track, each of said paths comprising two projections extending beyond said magnetizable coating and substantially parallel to said trolley track, at least one reading station fitted along said track, said station comprising a frame, a carriage borne by said frame, mounting means on said frame for said carriage and adapted for lateral swinging movement and transversal displacement of said carriage relative to said frame, two pairs of rollers having parallel axles rotatably fixed on said carriage around parallel axles, the distance between said axles not exceeding the length of said projections on said plate, electromagnetic reading means for scanning said magnetizable coating of said trolley plate, said reading means comprising at least one electromagnetic reading head secured to said carriage and located between said carriage roller axles, and resilient means secured to said frame and acting on said carriage for registering each pair of said carriage rollers respectively with one of said plate paths when said trolley passes by said station, thereby temporarily providing a constant air gap between said reading head and said magnetizable coating of said plate.

3. In a conveyor comprising a plurality of movable trolleys driven along a track, a system using magnetically recorded coded information for the individual remote control of said trolleys, said system comprising on some at least of said trolleys a plate rigidly fitted thereon, a magnetizable area on said plate for magnetically storing information useful to said remote control, two paths on said plate, respectively adjacent to said area and substantially parallel to said track, at least one reading station fitted along said track, said station comprising a fixed frame, a casing slidably mounted on said frame for sliding movement along said track from a rest position, a carriage borne by said casing, mounting means on said frame for said carriage and adapted for lateral swinging movement and transversal displacement of said carriage relative to said casing, two pairs of rolling members rotatably fixed on said carriage, electromagnetic reading means for scanning said magnetizable area of said trolley plate, said reading means comprising at least one electromagnetic reading head secured to said carriage, resilient means secured to said frame and acting on said carriage for registering each pair of said carriage rolling members respectively with one of said plate paths when said trolley passes by said station, thereby temporarily providing a constant air gap between said reading head and said magnetizable area of said plate, operating means to drive said casing with said trolley from said rest position when both are in adjacent positions, resilient means fitted on said frame to slide said casing back to said rest position in a direction contrary to that of said trolley, and means controlled by said trolley to release said operating means and to trigger said frame resilient means.

4. In a conveyor comprising a plurality of movable trolleys driven along a track, a system using magnetically recorded coded information for the individual remote control of said trolleys, said system comprising on some at least of said trolleys a plate rigidly fitted thereon, a magnetizable area on said plate for magnetically storing information useful to said remote control, two paths on said plate respectively adjacent to said area and substantially parallel to said track, at least one reading station fitted along said track, said station comprising a fixed frame, a casing slidably mounted on said frame for sliding movement along said track, a carriage borne by said casing, mounting means on said frame for said carriage and adapted for lateral swinging movement and transversal displacement of said carriage relative to said casing, two pairs of rolling members rotatably fixed on said carriage, electromagnetic reading means for scanning said magnetizable area of said trolley plate, said reading means comprising at least one electromagnetic reading head secured to said carriage, resilient means secured to said casing and acting on said carriage for registering each pair of said carriage rolling members respectively with one of said plate paths when said trolley passes by said station, thereby temporarily providing a constant air gap between said reading head and said magnetizable area of said plate, and resilient means fitted on said frame and energized by said trolley for imparting to said casing a sliding movement reverse to that of said trolley when said casing and trolley are substantially in coincidence, thereby allowing the scanning of said memory by said reading head during said reverse movement.

5. In a conveyor comprising a plurality of movable trolleys driven along a track, a system using magnetically recorded coded information for the individual remote control of said trolleys, said system comprising on some at least of said trolleys a plate rigidly fitted thereon, a magnetizable area on said plate for magnetically storing information useful to said remote control, two paths on said plate adjacent to said area and substantially parallel to said track, at least one reading station fitted along said track, said station comprising a fixed frame, a casing slidably mounted on said frame for sliding movement along said track from a rest position, resilient means fitted on said frame for limiting said sliding movement, a carriage borne by said casing, mounting means on said frame for said carriage and adapted for lateral swinging movement and transversal displacement of said carriage relative to said casing, two pairs of rolling members rotatably fixed on said carriage, electromagnetic reading means for scanning said magnetizable area of said trolley plate, said reading means comprising at least one electromagnetic reading head secured to said carriage, resilient means secured to said casing and acting on said carriage for registering each pair of said carriage rolling members respectively with one of said plate paths when said trolley passes by said station, thereby temporarily providing a constant air gap between said reading head and said magnetizable area of said plate, means energized by said trolley when passing by said station for driving said casing along said track, when trolley and casing are substantially in coincidence, thereby tightening said frame resilient means limiting the movement of said casing, and means to release said driving means, whereby said casing is pushed back by said resilient means towards its rest position, which allows the scanning of said magnetizable area on said plate by said reading head.

6. In a conveyor comprising a plurality of movable trolleys driven along a track, a system using magnetically recorded coded information for the individual remote control of said trolleys, said system comprising on some at least of said trolleys a plate rigidly fitted thereon, a magnetizable area on said plate for magnetically storing information useful to said remote control, two paths on said plate adjacent to said area and substantially parallel to said track, at least one reading station fitted along said track, said station comprising a fixed frame, a casing slidably mounted on said frame for sliding movement along said track, resilient means for limiting said sliding movement and keeping said casing in a rest position when inoperated, a carriage borne by said casing, mounting means on said frame for said carriage and adapted for lateral swinging movement and transversal displacement of said carriage relative to said casing, two pairs of rolling members rotatably fixed on said carriage, electromagnetic reading means for scanning said magnetizable area of said trolley plate, said reading means comprising at least one electromagnetic reading head secured to said carriage, resilient means secured to said casing and acting on said carriage for registering each pair of said carriage rolling members respectively with one of said plate paths when said trolley passes by said station, thereby temporarily providing a constant air gap between said reading head and said magnetizable area of said plate, said system further comprising a driving member borne by said trolley, retractable means borne by said casing for being engaged by said driving member when said trolley passes by said station and before scanning of said magnetizable area by said reading head, thereby carrying said casing away from its rest position and tightening said frame resilient means for limiting the sliding of said casing, and means to retract said retractable means when said frame resilient means are tightened, thereby triggering said frame resilient means which pushes said casing back to its rest position and allows the scanning of said magnetizable area by said reading head.

7. In a conveyor comprising a plurality of movable trolleys driven along a track, a system using magnetically recorded coded information for the individual remote control of said trolleys, said system comprising on some at least of said trolleys a plate rigidly fitted thereon, a magnetizable area on said plate for magnetically storing information useful to said remote control, said information consisting of bits recorded on two parallel tracks of said area, said bits being distributed along said tracks in conformity with a binary code of redundant nature, according to which the bits recorded by one of said tracks correspond to a code number to be recorded for the remote control of said trolley, whereas the bits on the second track correspond to the available positions for the bits on said first track, two paths on said plate adjacent to said plate magnetizable area and substantially parallel to said trolley track, at least one reading station fitted along said trolley track, said station comprising a frame, a carriage borne by said frame, mounting means on said frame for said carriage and adapted for lateral swinging movement and transversal displacement of said carriage relative to said frame, two pairs of rolling members rotatably fixed on said carriage, electromagnetic reading means for scanning said magnetizable area of said trolley plate, said reading means comprising two electromagnetic reading heads secured to said carriage and respectively adapted to scan one of said magnetizable area recording tracks, and resilient means secured to said frame and acting on said carriage for registering each pair of said carriage rolling members respectively with one of said plate paths when said trolley passes by said station, thereby temporarily providing a constant air gap between said reading heads and said magnetizable area of said trolley plate.

8. In a conveyor comprising a plurality of movable trolleys driven along a track, a system using magnetically recorded coded information for the individual remote control of said trolleys, said system comprising on some at least of said trolleys a plate rigidly fitted thereon, a magnetizable area on said plate for magnetically storing information useful to said remote control, said information consisting of bits recorded on two parallel tracks of said area, said bits being distributed along said tracks in conformity with a binary code of redundant nature, according to which the bits recorded by one of said tracks correspond to a code number to be recorded for the remote control of said trolley, whereas the bits on the second track correspond to the available positions for the bits on said first track, said code further being such that if there is one bit on said first track, no corresponding bit is recorded on said second track, two paths on said plate adjacent to said plate magnetizable area and substantially parallel to said trolley track, at least one reading station fitted along said track, said station comprising a frame, a carriage borne by said frame, mounting means on said frame for said carriage and adapted for lateral swinging movement and transversal displacement of said carriage relative to said frame, two pairs of rolling members rotatably fixed on said carriage, electromagnetic reading means for scanning said magnetizable area of said trolley plate and for checking the absence of error in the recording of said magnetizable area, said reading means comprising two electromagnetic reading heads secured to said carriage and respectively adapted to scan one of said magnetizable area recording tracks, and resilient means secured to said frame and acting on said carriage for registering each pair of said carriage rolling members with one of said plate paths when said trolley passes by said station, thereby temporarily providing a constant air gap between said reading heads and said magnetizable area of said trolley plate.

9. In a conveyor comprising a plurality of movable trolleys driven along a track, a system using magnetically recorded coded information for the individual remote control of said trolleys, said system comprising on some at least of said trolleys a plate rigidly fitted thereon, a magnetizable area on said plate for magnetically storing information useful to said remote control, said information consisting of bits recorded on two parallel tracks of said area, said bits being distributed along said tracks in conformity with a binary code of redundant nature, according to which the bits recorded by one of said tracks correspond to a code number to be recorded for the remote control of said trolley, whereas the bits on the second track correspond to the available positions for the bits on said first track, thereby permitting an arythmic scanning of said plate magnetizable area, two paths on said plate adjacent to said magnetizable area and substantially parallel to said trolley track, at least one reading station fitted along said track, said station comprising a frame, a carriage borne by said frame, two pairs of rolling members rotatably fixed on said carriage, electromagnetic reading means for scanning said magnetizable area of said trolley plate, said reading means comprising two electromagnetic reading heads secured to said carriage and respectively adapted to scan one of said magnetizable area recording tracks, resilient means secured to said frame and acting on said carriage for registering each pair of said carriage rolling members with one of said plate paths when said trolley passes by said station, and means on said reading station to compare the number recorded in said plate magnetizable area to a predetermined code number, said means comprising two conductors respectively connected to said reading heads, a counting chain of serially disposed elements, said elements comprising monostable multivibrators and logical circuits of the "AND" type, each of said logical circuits being connected to two multivibrators and selectively connected to either of said conductors according to a combination corresponding to said predetermined code number.

References Cited by the Examiner

UNITED STATES PATENTS

| | | | |
|---|---|---|---|
| 2,684,039 | 7/54 | King | 104—88 |
| 2,877,718 | 3/59 | Mittag | 104—88 |
| 2,967,295 | 1/61 | Dirks | 340—174.1 |
| 2,981,830 | 4/61 | Davis | 104—88 |
| 3,065,460 | 11/62 | Altenau et al. | 340—174.1 |
| 3,074,353 | 1/63 | Devonshire et al. | 104—88 |

FOREIGN PATENTS

| | | |
|---|---|---|
| 798,538 | 7/58 | Great Britain. |
| 962,971 | 5/57 | Germany. |
| 1,069,666 | 11/59 | Germany. |

LEO QUACKENBUSH, *Primary Examiner.*

JAMES S. SHANK, *Examiner.*